United States Patent [19]

Hasse

[11] 3,722,875
[45] Mar. 27, 1973

[54] ADJUSTABLE SUSPENSION UNIT

[75] Inventor: Hans O. Hasse, Alamogordo, N. Mex.

[73] Assignee: The United States of America as represented by the Secretary of the Air Force

[22] Filed: Apr. 29, 1971

[21] Appl. No.: 138,426

[52] U.S. Cl. ..................................267/122
[51] Int. Cl. ..................................F16k 5/00
[58] Field of Search........267/160, 113, 121, 122, 64, 267/123

[56] References Cited

UNITED STATES PATENTS 2,776,829   1/1957   Cockram..............................267/122

Primary Examiner—James B. Marbert
Attorney—Harry A. Herbert, Sr. and Jacob N. Erlich

[57] ABSTRACT

An adjustable suspension unit having an outer housing encompassing a pair of counteracting bellows which are surrounded by a pair of damping bellows, respectively. Separating one set of counteracting and damping bellows from the other set of counteracting and damping bellows, is a middle plate utilized for supporting the equipment to be suspended. By regulating the volume and pressure within the counteracting bellows, the load carrying capacity and spring stiffness of the unit can be easily adjusted. Adjustment of the damping bellows can also be performed if necessary.

10 Claims, 2 Drawing Figures

INVENTOR.
HANS O. HASSE
BY Harry A. Herbert Jr
Jacob N. Erlich and
ATTORNEYS

ADJUSTABLE SUSPENSION UNIT

BACKGROUND OF THE INVENTION

This invention relates generally to suspension units, and more particularly, to an adjustable suspension unit which allows for wide range, independent adjustment of the supporting forces, the active spring stiffness and the damping forces.

With the advent of extremely sensitive equipment, it has become a great problem of supporting such equipment in a vibrational environment. For example, the supporting of guidance equipment or components during test procedures on a rocket sled has become a major problem. The natural vibrational environment produced by the sled's motion must be overcome so that an overload on the equipment under test conditions will not take place. Heretofore, suspension systems have failed to provide an easily adjustable unit which can be controlled over a relatively wide range of different load conditions and vibrational requirements. Of particular necessity is an adjustable suspension unit capable of easily adjusting supporting forces, spring stiffness and damping forces.

SUMMARY OF THE INVENTION

The instant invention sets forth a suspension unit which overcomes the problems set forth hereinabove.

The adjustable suspension unit of the instant invention allows for wide range, independent adjustment of the supporting forces (lb.), the active spring stiffness (lb./inch) and the damping forces (lb./inch/sec.) This means all quantities which determine the vibrational transfer function for a given mass system can easily be set to optimize the response characteristic of the suspension system of this invention. The adjustable suspension unit also could eventually be actively controlled during operation, if necessary.

This adjustable suspension unit is made up of a counteracting air spring in the form of a pair of air bellows filled with a predetermined air pressure. The air spring is surrounded by an adjustable viscous damping unit made up of a pair of bellows filled with any suitable liquid and interconnected through variable adjustable orifices. The entire unit has a cylindrical shape with about an equal diameter and height. The upper and lower ends of the unit are fixed to a supporting structure, and the outer surface of the unit is fixed to the load to be supported (or vice versa).

Maximum assumed working displacement of the unit is plus or minus one quarter (± ¼) of the total heights of the suspension unit with the spring and damping forces of the unit, acting in the up-down direction, having negligible coupling in the two other directions (left-right and forward-backward). The load carrying capacity and spring stiffness of the unit of this invention are preset in the following way:

The two counteracting air bellows are filled with a predetermined air pressure. The pressure difference $\Delta p$ of the two bellows in zero position times the cross section area of the two bellows determines the static load carrying capacity of the unit. To adjust the spring stiffness of the instant unit at a chosen static spring force there are two procedures to achieve this:

I. The air pressure in both bellows can be changed with the $\Delta p$ kept at the same magnitude; or II. The total volume of the bellows can be changed by either adding the volume of air reservoirs or subtracting the volume of liquid bladders associated therewith.

Damping of the suspension unit of this invention is accomplished by the air bellows being located within another set of bellows which are filled with liquid. These bellows, filled with liquid, are connected to each other through variable adjustable orifices in a middle plate. Any displacement of the suspension unit will force liquid through the adjustable orifices from one bellows into the other. The size of the cross section area of the orifices determines the viscous friction due to flow through these orifices. These losses are identical with the viscous damping forces of the adjustable suspension unit. Therefore, any required damping can be obtained independently from static load requirements and spring stiffness by setting the adjustable orifices to a compatible through flow.

For some uses, it may be advantageous to control some of the adjustable suspension unit's parameters during operation thereof. After adjusting the static load capability, the spring stiffness, and the damping to optimum transfer characteristic, it may occur that the spring stiffness of forward and backward directed suspension units will not be compatible to sustained acceleration and deceleration. In this case it is possible to program or control the pressure in the "pushing" suspension units air bellows to adapt to changing sustained $g$ loads and so avoid bottoming or undue displacement of these units. It is also conceivable to use an extra suspension unit in the "pushing direction" with minimum damping and with relatively large air reservoirs. The controlled or programmed pressure in the bellows of this extra suspension unit could compensate for displacement due to any sustained linear acceleration.

The way the adjustable suspension unit of this invention is set up makes it possible to add another operational feature. In some cases it may be advantageous to have a damping characteristic which is amplitude dependent. To accomplish this feature a control needle is mounted within the orifices in the middle plate reaching from the lower to the upper inner liquid damping bellows, double tapered from the middle of the damping control orifice. Such a needle will leave the orifice wide open in the middle (zero deflection) position and will progressively close the orifice at large amplitudes.

It is therefore an object of this invention to provide a suspension unit which allows for free and independent adjustment and control of the three main characteristics of the suspension system; namely: the load carrying force capability at zero deflection, the spring stiffness, and the damping.

It is another object of this invention to provide a suspension unit having a damping characteristic which is amplitude dependent.

It is a further object of this invention to provide a suspension unit which is economical to produce and which utilizes conventional currently available materials that lend themselves to standard mass producing manufacturing techniques.

For a better understanding of the present invention together with other and further objects thereof, reference is made to the following description taken in

DESCRIPTION OF THE PREFERRED EMBODIMENT

Figure 1:
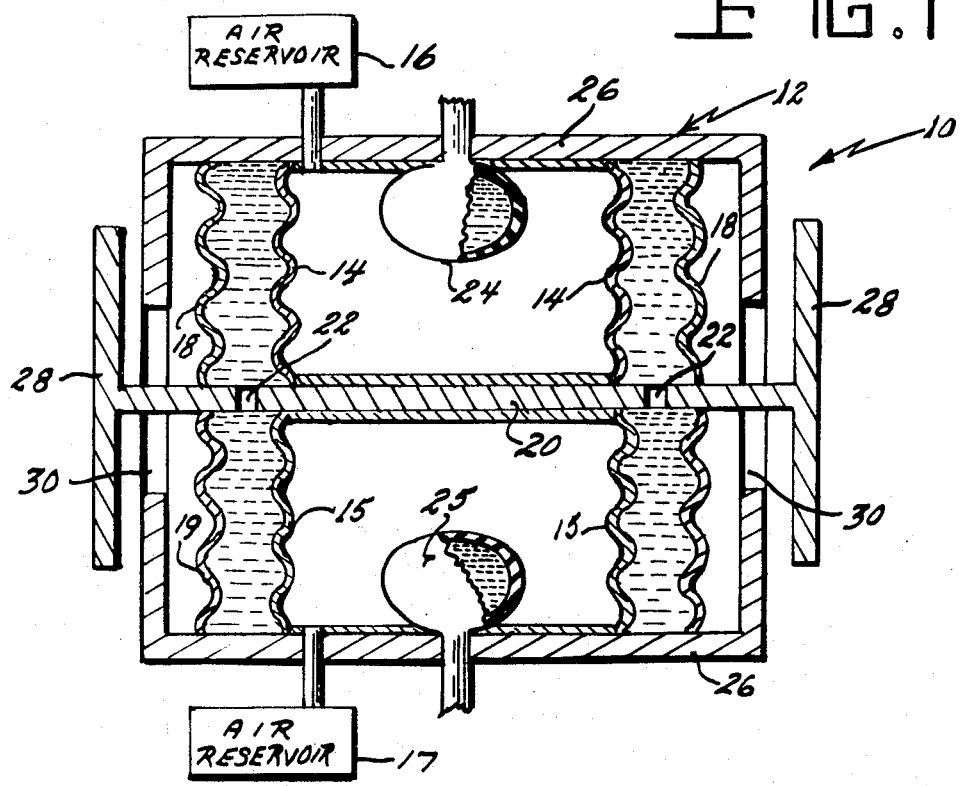
FIG. 1 is a side elevational view, shown partly in cross-section, of the suspension unit of this invention.

Reference is now made to FIG. 1 of the drawing which shows the suspension unit 10 of this invention in detail. This suspension unit 10 is completely adjustable and allows for a wide range and independent adjustment of the supporting forces (lb.), the active spring stiffness (lb./inch) and the damping forces (lbs./inch/sec.). In other words, with the utilization of this invention all quantities which determine the vibrational transfer function for a given mass system can be easily set to optimize the response characteristic of the system.

The suspension unit 10 is made up of an outer housing 12 preferably of cylindrical configuration and having approximately equal diameter and height. Within outer housing 12 are a pair of counteracting air bellows 14 and 15 made of any suitable material, such as rubber or a lightweight metal and filled with a predetermined air pressure from a pair of air reservoirs 16 and 17, respectively, connected thereto. Surrounding each of the air bellows, 14 and 15, is another pair of bellows 18 and 19, respectively, utilized for damping. These bellows 18 and 19 are filled with any suitable liquid. Separating one set of air bellows 14 and damping bellows 18 from the other set of bellows 15 and 19 is a middle plate 20 made preferably of a rigid material such as metal. This middle plate 20 has at least one conventionally adjustable orifice 22 therein which allows the liquid to flow from bellows 18 to bellows 19. Any displacement of the middle plate 20 of suspension unit 10 will force the liquid through the adjustable orifices 22 from one bellows into the other. The size of the cross-section area of the orifice 22 will determine the viscous friction due to the flow through these orifices 22.

Still referring to FIG. 1, mounted within each of the air bellows 14 and 15 is a liquid bladder 24 and 25, respectively, which may be filled or evacuated for the purpose of adjusting the spring stiffness in a manner to be set forth in detail hereinbelow.

In operation, the upper and lower ends 26 of the unit 10 are fixed to the supporting structure (not shown), while the outer ends 28 of middle plate 20 which protrude through an opening 30 in housing 12 is fixedly secured to any equipment to be supported by the suspension unit 10. Although this is the preferred mounting arrangement of this invention the position of the equipment and supporting structure may be interchanged.

The middle plate 20 of the suspension unit 10 has a maximum assumed working displacement of approximately one-fourth of the total height of the entire unit. The spring and damping forces of the unit 10 act in the up-down direction with negligible coupling in the two other directions.

To determine the load-carrying capacity (lb.) and the spring stiffness (lbs./inch) of the suspension unit 10 of this invention, the following procedures are followed.

The two counteracting air bellows, 14 and 15, are filled with a predetermined air pressure from reservoirs 16 and 17. The pressure difference $\Delta p$ of the two bellows 14 and 15 in the zero position times the cross section area of the two bellows 14 and 15 determines the static load carrying capacity of this unit 10. For example, with an assumed active cross section area of 9.8 in.$^2$ of the air bellows 14 and 15, each psi $\Delta p$ will result in 9.8 lbs. carrying capacity. Therefore, a 10.2 psi $\Delta p$ results in a static spring force of approximately 100 lbs at zero position.

To adjust the spring stiffness (lbs./inch) of the suspension unit of this invention at a chosen static spring force (lbs.), there are two procedures:

I. The air pressure in both bellows 14 and 15 can be changed with the $\Delta p$ kept at the same magnitude, or II. The total volume of the bellows 14 and 15 can be changed by either adding the volumes of the air reservoirs 16 and 17 or subtracting the volume of the liquid bladders 24 and 25.

The first procedure is limited by the fact that for large required spring stiffness we cannot go above a maximum static air pressure in the two air bellows due to design limitations; and for low required spring stiffness we do not want to work with one air bellows evacuated to lower than atmosphere pressure at the zero position. The second procedure has virtually no limitations.

The following examples are given to show how the spring stiffness of the suspension unit 10 can be modified independently from the static load by using these two procedures. All intermediate spring stiffness between the calculated values can be obtained. Unlimited lower spring stiffness as calculated here is easily obtained by using larger air reservoirs 16 and 17 than assumed in these calculations.

A static load of 30 lbs. is assumed for all following Examples. Therefore, $$\Delta p \text{ (at zero)} = \frac{30 \text{ lb.}}{9.8 \text{ lb./p.s.i.}} \simeq 3 \text{ p.s.i.}$$

Case 1.

Upper air bellows 14 = atmospheric pressure = 14.7 psi (absolute)

Lower air bellows 15 = atmospheric pressure + 3 psi $\cong$ 17.7 psi (absolute)

At deflection of the middle plate 20, the air pressure in the two air bellows 14 and 15 will change in an inverse proportion to the volume change in the bellows.

If we deflect the unit 1 inch down (height of bellows in zero position = 2 inch) we obtain:

Lower bellows 15 = 17.7 psi×2 = 35.4 psi (absolute)

Upper bellows 14 = 14.7 psi×2/3 = 9.8 psi (absolute)

$$\Delta p \text{ (1 inch)} = 25.6 \text{ psi}$$

Average spring stiffness $$= \frac{(25.6 \text{ p.s.i.} - 3 \text{ p.s.i.}) \times 9.8 \text{ lb./p.s.i.}}{1 \text{ inch}}$$

over 1 inch deflection = 221.4 lb./inch
Procedure I obtaining higher spring stiffness
Case 2.
   Upper bellows 14 = atmospheric pressure + 10 psi = 24.7 psi (absolute)
   Lower bellows 15 = atmospheric pressure + 13 psi = 27.7 psi (absolute)
   If we deflect 1 inch down we obtain:
   Lower bellows 15 = 27.7 psi × 2 = 55.4 psi (absolute)
   Upper bellows 14 = 24.7 psi × ⅔ = 16.5 psi (absolute)
   $\Delta p$ (1 inch) = 38.9

Average spring stiffness $$= \frac{(38.9 \text{ p.s.i.} - 3 \text{ p.s.i.}) \times 9.8 \text{ lb./p.s.i.}}{1 \text{ inch}}$$

over 1 inch deflection = 351.8 lb./inch
Procedure (I & II) obtaining higher spring stiffness
Case 3.
   Upper bellows 14 = atmospheric pressure + 10 psi = 24.7 psi (absolute)
   Lower bellows 15 = atmospheric pressure + 13 psi = 27.7 psi (absolute)
Both liquid bladders 24 and 25 filled to one quarter of zero deflected air bellow volume.
   If we deflect 1 inch down we obtain:
   Lower bellows 15 = 27.7 psi × 3 = 83.1 psi (absolute)
   Upper bellows 14 = 24.7 psi × 3/5 = 14.8 psi (absolute)
   $\Delta p$ (1 inch) = 68.3 psi Average spring stiffness $$= \frac{(68.3 \text{ p.s.i.} - 3 \text{ p.s.i.}) \times 9.8 \text{ lb./p.s.i.}}{1 \text{ inch}}$$

over 1 inch deflection = 640 lb./inch
Procedure II obtaining lower spring stiffness
Case 4.
   Upper bellows 14 = atmospheric pressure = 14.7 psi (absolute)
   Lower bellows 15 = atmospheric pressure + 3 psi = 17.7 psi (absolute)
   (Using air reservoirs 16 and 17). Using air reservoirs 16 and 17 with the same volume as the undeflected air bellows.
   If we deflect 1 inch down we obtain
   Lower bellows 15 = 17.7 psi × 4/3 = 23.6 psi (absolute)
   Upper bellows 14 = 14.7 psi × 4/5 = 11.8 psi (absolute)
   $\Delta p$ (1 inch) = 0 11.8 psi Average spring stiffness = $\frac{(11.8 - 3 \text{ p.s.i.}) \times 9.9 \text{ lb./p.s.i.}}{1 \text{ inch}}$ over 1 inch deflection = 86.2 lb./inch
Procedure IV obtaining even lower spring stiffness
Case 5.
   Upper bellows 14 = atmospheric pressure = 14.7 psi (absolute)
   Lower bellows 15 = atmospheric pressure + 3 psi = 17.7 psi (absolute)
Using air reservoirs 16 and 17 with double the volume as the undeflected bellows.
   If we deflect 1 inch down we obtain:
   Lower bellows 15 = 17.7 psi × 6/5 = 21.2 psi (absolute)
   Upper bellows 14 = 14.7 psi × 6/7 = 12.6 psi $\Delta p$ (1 inch) = 8.6 psi
Average spring stiffness $$= \frac{(8.6 \text{ p.s.i.} - 3 \text{ p.s.i.}) \times 9.8 \text{ lb./p.s.i.}}{1 \text{ inch}}$$

over 1 inch deflection = 54.9 lb./inch In these five calculations we have covered a spring stiffness from 54.9 lb/inch to 640 lb/inch.

The calculated spring stiffness is only little affected by the static load carrying capacity of the suspension unit 10. To show this, we will in Case No. 5 replace the 30 lb static load by a 60 lb static load. This, of course, means we have to add another 3 psi $\Delta p$ at zero deflection.

Procedure II obtaining low spring stiffness for double static load as in No. 5.
Case 5a with 60 lb static load capability:
   Upper bellows 14 = atmospheric pressure = 14.7 psi (absolute)
   Lower bellows 15 = atmospheric pressure + 6 psi = 20.7 psi (absolute)
Using air reservoirs 16 and 17 with double the volume as the undeflected bellows (See No. 5).
   If we deflect 1 inch down we obtain:
   Lower bellows 15 = 20.7 psi × 6/5 = 24.8 psi (absolute)
   Upper bellows 14 = 14.7 psi × 6/7 = 12.6 psi (absolute)
   $\Delta p$ (1 inch) = 12.2 psi Average spring stiffness $$= \frac{(12.2 \text{ p.s.i.} - 6 \text{ p.s.i.}) \times 9.8 \text{ lb./p.s.i.}}{1 \text{ inch}}$$

over 1 inch deflection = 60.6 lb./inch as compared to 54.9 lb/inch from No. 5.

So far the possibility to adjust the static load carrying capacity (lb.) and spring stiffness (lb./inch) of the adjustable suspension unit 10 independently has been shown.

In order to dampen the unit 10, the air bellows 14 and 15 are located within bellows 18 and 19, respectively, which are filled with liquid. Any displacement of the middle plate 20 forces the liquid through the adjustable orifices 22 from one bellows to another. The larger the orifices 22 cross section area, the smaller the damping forces, and vice versa. Therefore, any required damping can be obtained independently from static load requirements and spring stiffness by setting the adjustable orifices 22 to a compatible through flow.

Figure 2:
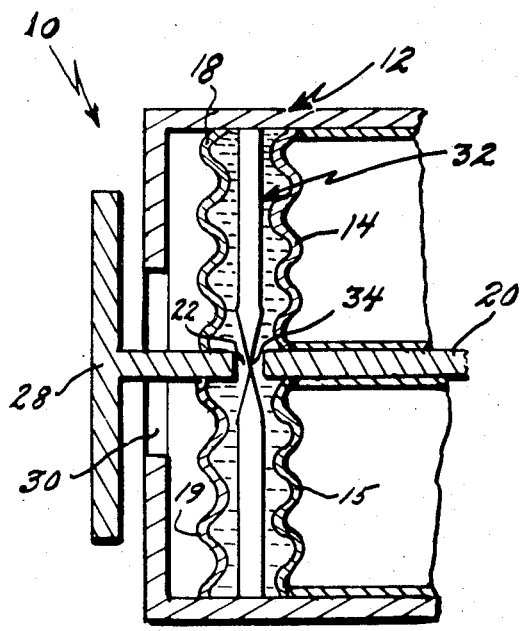
FIG. 2 is a side elevational view, shown partly in cross-section, of a modification of the suspension unit of this invention for producing a damping characteristic which is amplitude dependent.

Referring now to FIG. 2 of the drawing, a modification of the suspension unit 10 is shown in order to produce a damping characteristic which is amplitude dependent, e.g. low damping at small amplitude, high damping at large amplitudes. The suspension unit 10 of FIG. 2 is identical to that shown in FIG. 1 with the addition of a control needle 32 reaching from the lower liquid bellow 19 to the upper liquid bellow 18. This needle 32 may protrude through any or all of the orifices 22 and is double tapered from the middle 34 of the damping control orifice 22. Under operating conditions the control needle will leave the orifice 22 wide open in the middle (zero deflection) position and will progressively close the orifice 22 at large amplitudes.

It is therefore clear that the above disclosed invention solves the problem of redesigning the entire suspension unit of a mass, whenever a change of mass, of vibrational environment, or of the response characteristic is prevalent or required. It further leads to the possibility to control (with adequate sensors) the response characteristic automatically to adapt for changing vibrational environment and changing response requirements. If required, it is also capable of repositioning and/or automatically changing the orientation of the suspended mass.

Although this invention has been described with reference to a particular embodiment, it will be understood to those skilled in the art that this invention is also capable of a variety of alternative embodiments within the spirit and scope of the appended claims.

I claim:

1. An adjustable suspension unit comprising an outer housing, a first set of bellows mounted within said housing, a second set of bellows mounted in said housing juxtaposed said first set of bellows and a plate mounted within said housing in such a position as to separate said first set of bellows from said second set of bellows whereby regulating the pressure and volume of said first and second set of bellows adjusts the load carrying capacity and spring stiffness of said suspension unit.

2. An adjustable suspension unit as defined in claim 1 wherein said first and second set of bellows are each made up of a counteracting bellows surrounded by a damping bellows, and at least one adjustable orifice is located in said plate between said pair of damping bellows thereby regulating the damping of said suspension unit.

3. An adjustable suspension unit as defined in claim 2 further comprising a bladder mounted within at least one of said counteracting bellows whereby inflating or deflating said bladder adjusts the spring stiffness of said suspension unit.

4. An adjustable suspension unit as defined in claim 3 wherein said pair of damping bellows are filled in a liquid.

5. An adjustable suspension unit as defined in claim 4 further comprising at least one air reservoir operably connected to said counteracting bellows for increasing or decreasing the volume thereof.

6. An adjustable suspension unit as defined in claim 5 further comprising a control needle fixedly secured to said housing and reaching from one of said damping bellows to the other, said control needle further protruding through said orifice thereby producing a damping characteristic which is amplitude dependent.

7. An adjustable suspension unit as defined in claim 6 wherein said housing has an opening therein and said plate protrudes therethrough whereby equipment can be mounted thereon.

8. An adjustable suspension unit as defined in claim 2 further comprising a control needle fixedly secured to said housing and reaching from one of said damping bellows to the other, said control needle further protruding through said orifice thereby producing a damping characteristic which is amplitude dependent.

9. An adjustable suspension unit as defined in claim 8 further comprising at least one air reservoir operably connected to said counteracting bellows for increasing or decreasing the volume thereof.

10. An adjustable suspension unit as defined in claim 9 further comprising a bladder mounted within at least one of said counteracting bellows whereby inflating or deflating said bladder adjusts the spring stiffness of said suspension unit.

* * * * *